United States Patent
Hojo et al.

(10) Patent No.: US 6,808,726 B2
(45) Date of Patent: Oct. 26, 2004

(54) MANUFACTURING METHOD OF FOOD ADDITIVE COMPOSITION AND FOOD COMPOSITION CONTAINING THE SAME

(75) Inventors: Hisakazu Hojo, Hyogo (JP); Naoki Kubota, Hyogo (JP); Yoshimasa Morisaki, Hyogo (JP)

(73) Assignee: Maruo Calcium Company Limited, Akashi (JP)

( * ) Notice: Subject to any disclaimer, the term of this patent is extended or adjusted under 35 U.S.C. 154(b) by 198 days.

(21) Appl. No.: 10/000,130

(22) Filed: Dec. 4, 2001

(65) Prior Publication Data

US 2003/0091695 A1 May 15, 2003

(30) Foreign Application Priority Data

Aug. 24, 2001 (JP) ........................................ 2001-253957

(51) Int. Cl.⁷ .............................................. A23L 1/304
(52) U.S. Cl. .......................................... 426/74; 426/518
(58) Field of Search ................................ 426/74; 11/518

(56) References Cited

U.S. PATENT DOCUMENTS

| | | | | |
|---|---|---|---|---|
| 4,214,996 A | * | 7/1980 | Buddemeyer et al. | ......... 252/1 |
| 5,643,622 A | * | 7/1997 | Sawhill | ..................... 426/41 |
| 6,248,376 B1 | * | 6/2001 | Buddemeyer et al. | ........ 426/74 |

* cited by examiner

*Primary Examiner*—Helen Pratt
(74) *Attorney, Agent, or Firm*—Armstrong, Kratz, Quintos, Hanson & Brooks, LLP

(57) ABSTRACT

A method for manufacturing a food additive slurry composition is disclosed which comprises preparing a precursor by mixing water, a polyvalent metal compound and an organic acid having a carboxyl group, then adding to the precursor a phosphoric acid source and an alkali metal by the specific method. The obtained food additive slurry composition is not only excellent in dispersibility, dispersion stability in liquid and flavor, but low in slurry viscosity and good in handling.

7 Claims, No Drawings

MANUFACTURING METHOD OF FOOD ADDITIVE COMPOSITION AND FOOD COMPOSITION CONTAINING THE SAME

BACKGROUND OF THE INVENTION

1. Field of the Invention

The present invention relates to a manufacturing method of a food additive composition and a food composition containing the same, and more particularly, to a manufacturing method of a food additive composition extremely excellent in dispersion stability to be used effectively for reinforcing minerals by addition to foods such as yogurt, milk, juice, cream for coffee, powdered milk and candies, and a food composition containing such food additive composition obtained by the same method.

2. Description of the Prior Art

Recently, shortage of uptake of calcium, magnesium, iron and the like is pointed out, and this tendency is prominent among growing children and elder people.

Calcium is not only important for growth of bones, but also plays a vital role for contracting and expanding muscles and maintaining the homeostasis in the body. Moverover, magnesium acts to relax and dilate the muscles and blood vessels, and it is an indispensable mineral for the human. Deficiency of magnesium is considered to lead to hypertension, angina pectoris, hyperlipidemia, and other diseases. At the same time, magnesium is closely related with metabolism of calcium, and its shortage causes various symptoms due to dysbolism. Further, magnesium is related to various enzymatic reactions, and is said to maintain the homeostasis in the body. However, in recent years, people come to prefer European style eating habit and highly refined cereals, and the majority of magnesium is lost in the food refining process and it tends to be lacking in the eating life of the present days, and magnesium-enriched food is attracting attention lately.

Further, anemia due to iron shortage is widely reported among women recently. This tendency is particularly notable among schoolgirls and young women. Asiderotic anemia is mainly attributable to eating habit, but women are more vulnerable onset of anemia by iron shortage owing to physiological menstruation, increase of iron demand due to pregnancy, or shortage of uptake by extreme diet, and generally approximately half of women are in shortage of iron. To solve this iron shortage problem, iron-enriched foods have been commercially available, and milk and carbonated beverages of higher iron contents are started to be sold widely.

To compensate such shortage of uptake of various minerals, mineral-enriched foods are distributed, and even in the cow milk that is generally high in mineral contents, further minerals are added, and mineral-enriched milk products are supplied, and many other mineral-enriched products of juice and powdered milk are also on market.

In milk and yogurt, for example, with the purpose of reinforcing in minerals, water soluble inorganic or organic minerals such as calcium lactate, calcium chloride, magnesium chloride, and ammonium ferric citrate, or water insoluble inorganic minerals such as calcium carbonate, calcium phosphate, dolomite, and ferric pyrophosphoric acid are added and used. However, water soluble inorganic or organic minerals are likely to impair the stability of protein in the milk or yogurt, and it is hard to contain more than a certain amount, and they cannot be used abundantly as mineral materials. Besides, the peculiar bitter taste is also a problem.

On the other hand, water insoluble inorganic minerals are not soluble in water and do not disturb the stability of protein in the milk or yogurt, and high contents can be added, but the specific gravity of inorganic minerals is generally as high as 2.1 or higher, and they sediment in a short time when dispersed in milk, and the appearance of food is inferior, and hence the amount added is limited, which results in having a drawback that they cannot be added plentifully.

Various methods have been proposed so far in order to add high contents of calcium in food by overcoming these problems, and, for example, Japanese Unexamined Patent Publication No. Hei 9-9911 discloses a method of improving the dispersion by adding at least one selected from the group consisting of phospholipids and proteolytes to calcium carbonate, and grinding in a wet process. In this method of adding phospholipids or proteolytes, however, since the phospholipids have a peculiar smell and bitterness, the problem in flavor is serious, and according to this publication, the average particle size of calcium dispersion is 1 to 3 µm, and the milk containing calcium carbonate obtained by this method is poor in the yield of calcium carbonate in the clarifier or other centrifugal classifiers in the manufacturing process, and it is likely to sediment in milk or other food products, and hence it is far from ideal for application in long-term preservative food such as long-life milk.

In Japanese Unexamined Patent Publication No. Sho 55-84327, it is proposed to obtain a mineral-enriched substance by mixing (1) a cation supply source selected from the group consisting of calcium, magnesium, iron, copper, boron, zinc, manganese, molybdenum, arsenic, silver, aluminum, barium, bismuth, mercury, nickel, lead, platinum, antimony, and tin, (2) an alkali phosphate supply source selected from the group consisting of potassium phosphate, dipotassium hydrogenphosphate, mixtures of alkali metal hydroxide and phosphoric acid, and alkali metal hydrogenphosphate, and (3) an organic acid containing at least three carboxyl groups, in the sequence of the cation supply source, the alkali phosphate supply source, and finally the organic acid source. In the dispersion state of the food additive composition prepared in such adding sequence, according to the publication, the theoretical effective utilization rate of minerals is not sufficient, and the milk containing the food additive composition obtained by this method is, just as in Japanese Unexamined Patent Publcaiton No. Hei 9-9911, poor in the yield of calcium compounds in the clarifier or other centrifugal classifiers in the manufacturing process, and it is likely to sediment in milk or other food products, and hence it is far from ideal for application in long-term preservative food.

Lately, along with progress in the container and storage method capable of preserving liquid food products such as milk, yogurt and juice for a long term, more and more food products are stored for a longer period in retail shops, vending machines, and large household refrigerators, and calcium carbonate particles added in these foods for enriching calcium contents may sediment in the bottom of the food containers during long-term storage if the dispersion state in the foods is not favorable, and the sediments may give impression of discomfort or uncleanness to the consumers when taking such milk, juice and liquid food products.

Therefore, existing commercial liquid food products containing inorganic particles of calcium carbonate or the like prepared by the prior art for the purpose of enriching calcium contents are short in stable dispersion period of inorganic particles in food, and the content of inorganic particles must be limited to a minimum, and the use is limited to liquid foods to be consumed within one or two days after purchase by consumers.

SUMMARY OF THE INVENTION

In the light of this background, it is hence an object of the invention to solve these problems in the prior art, and to provide a manufacturing method of food additive composition extremely excellent in dispersibility preferably used as additives to food such as yogurt, milk, juice, cream, powdered milk and candies, and a food composition containing the food additive obtained by such method.

A first aspect of the present invention relates to a method for manufacturing a food additive slurry composition containing a polyvalent metal, a phosphoric acid ion, an organic acid having a carboxyl group, and alkali metal, comprising the steps of:

preparing a precursor by mixing water, a polyvalent metal compound, and an organic acid having a carboxyl group, and adding a phosphoric acid source and an alkali metal in at least one method selected from the group consisting of (a), (b), (c), (d), and (e) shown below:

(a) Addition of an alkali metal phosphate and/or an alkali metal of condensed phosphoric acid, (b) Simultaneous addition of an alkali metal phosphate and/or an alkali metal of condensed phosphoric acid, and an alkali metal salt, (c) Simultaneous addition of phosphoric acid and/or condensed phosphoric acid, and an alkali metal salt, (d) Addition of an alkali metal phosphate and/or an alkali metal of condensed phosphoric acid, and then addition of an alkali metal salt, and (e) Addition of phosphoric acid and/or condensed phosphoric acid, and then addition of an alkali metal salt.

A second aspect of the present invention relates to a method for manufacturing a food additive slurry composition comprising the steps of:

containing 2 to 80 parts by weight of an emulsification stabilizer in 100 parts by weight of a solid content of a food additive slurry composition containing a polyvalent metal, a phosphoric acid ion, an organic acid having a carboxyl group, and an alkali metal obtained by preparing a precursor by mixing water, a polyvalent metal compound, and an organic acid having carboxyl group, and adding a phosphoric acid source and an alkali metal in at least one method selected from the group consisting of (a), (b), (c), (d), and (e) shown below, and dispersing the obtained mixed slurry by a grinding machine and/or a dispersing machine:

(a) Addition of an alkali metal phosphate and/or an alkali metal of condensed phosphoric acid, (b) Simultaneous addition of an alkali metal phosphate and/or an alkali metal of condensed phosphoric acid, and an alkali metal salt, (c) Simultaneous addition of phosphoric acid and/or condensed phosphoric acid, and an alkali metal salt, (d) Addition of an alkali metal phosphate and/or an alkali metal of condensed phosphoric acid, and then addition of an alkali metal salt, and (e) Addition of phosphoric acid and/or condensed phosphoric acid, and then addition of an alkali metal salt.

A third aspect of the present invention relates to a food additive powder composition obtained by grinding and drying the food additive slurry composition obtained in the above method.

A fourth aspect of the present invention relates to a food composition containing the food additive composition obtained in the above method.

DETAILED DESCRIPTION OF THE INVENTION

Examples of the polyvalent metal compound usable in the present invention include calcium hydroxide, magnesium hydroxide, iron hydroxide, calcium oxide, magnesium oxide, iron oxide, calcium chloride, magnesium chloride, iron chloride, calcium carbonate, magnesium carbonate, iron carbonate, calcium nitrate, magnesium nitrate, iron nitrate, calcium sulfate, magnesium sulfate, iron sulfate, calcium phosphate, magnesium phosphate, iron phosphate, ferric pyrophosphoric acid, and dolomite, and they can be used either alone or in combination of two or more. To obtain a food additive slurry composition of a superior dispersibility, it is preferred to use at least one selected from the group consisting of calcium hydroxide, magnesium hydroxide, iron hydroxide, calcium oxide, magnesium oxide, iron oxide, magnesium carbonate, calcium carbonate, iron carbonate, and dolomite.

Examples of the organic acid having a carboxyl group usable in the present invention include malic acid, succinic acid, citric acid, adipic acid, fumaric acid, glutamic acid, their alkali metal salts, and polyvalent metal salts, and they can be used either alone or in combination of two or more. To obtain a food additive-slurry composition of a superior dispersibility, it is preferred to use at least one selected from the group consisting of citric acid, potassium citrate, sodium citrate, calcium citrate, magnesium citrate, ammonium ferric citrate, iron citrate, and sodium ferrous citrate.

The phosphoric acid source and the alkali metal usable in the present invention include alkali metal phosphates and/or alkali metals of condensed phosphoric acid, and examples are a sodium salt and a potassium salt of phosphoric acid, a sodium salt and a potassium salt of condensed phosphoric acid, a mixture of phosphoric acid, a sodium salt and a potassium salt, and a mixture of condensed phosphoric acid, a sodium salt and a potassium salt, and they can be used either alone or in combination of two or more.

The phosphoric acid source and the alkali metal usable in the present invention may also include phosphoric acid and/or condensed phosphoric acid and an alkali metal salt, and examples of the alkali metal salt are sodium hydroxide, potassium hydroxide, sodium oxide, potassium oxide, sodium carbonate, sodium hydrogencarbonate, potassium carbonate, and potassium hydrogencarbonate, and they can be used either alone or in combination of two or more.

The condensed phosphoric acid usable in the present invention includes pyrophosphoric acid, tripolyphosphoric acid, tetrapolyphosphoric acid, pentapolyphosphoric acid, and hexamethaphosphoric acid, and they can be used either alone or in combination of two or more.

A first manufacturing method of the present invention is to prepare a food additive slurry composition containing a polyvalent metal, a phosphoric acid ion, an organic acid having a carboxyl group, and an alkali metal, obtained by preparing a precursor by mixing water, a polyvalent metal compound, and an organic acid having a carboxyl group, and adding to the precursor a phosphoric acid source and an alkali metal in at least one method selected from the group consisting of (a), (b), (c), (d), and (e) shown below:

(a) Addition of an alkali metal phosphate and/or an alkali metal of condensed phosphoric acid, (b) Simultaneous addition of an alkali metal phosphate and/or an alkali metal of condensed phosphoric acid, and an alkali metal salt, (c) Simultaneous addition of phosphoric acid and/or condensed phosphoric acid, and an alkali metal salt, (d) Addition of an alkali metal phosphate and/or an alkali metal of condensed phosphoric acid, and then addition of an alkali metal salt, and (e) Addition of phosphoric acid and/or condensed phosphoric acid, and then addition of an alkali metal salt.

To obtain the food additive slurry composition of the present invention, the molar ratios of components at the time of preparation are preferred to be in the specified ranges. That is, the ratio of the polyvalent metal ion:the organic acid ion having a carboxyl group is in a range of 0.8:1 to 7:1, and to obtain a food additive slurry composition of a superior dispersibility, it is preferred to be in a range of 1.8:1 to 4:1, more preferably, 1.8:1 to 2.7:1. The ratio of the organic acid ion having a carboxyl group:the phosphoric acid ion is in a range of 1:0.6 to 1:2.8, and to obtain a food additive slurry composition of a superior dispersibility, it is preferred to be in a range of 1:1 to 1:2.4, more preferably. 1:1.3 to 1:1.85. The ratio of the organic acid ion having carboxyl group:the alkali metal ion is in a range of 1:1 to 1:8, and to obtain a food additive slurry composition of a superior dispersibility, it is preferred to be in a range of 1:1.5 to 1:5, more preferably, 1:2 to 1:4.

When the molar ratio of the polyvalent metal ion to the organic acid ion having a carboxyl group is less than 0.8, the dispersion state tends to be unstable and it is not preferable, or when the molar ratio exceeds 7, the polyvalent metal ions tends to be left in ion state, and when used in milk, for example, the stability of protein is likely to be disturbed and there is a thickening tendency, which may lead to gelation or loss of flavor in an extreme case.

If the molar ratio of the phosphoric acid ion to the organic acid having a carboxyl group is less than 0.6, the dispersion state tends to be unstable and it is not preferable, or when the molar ratio exceeds 2.8, aggregates of an inorganic polyvalent metal are likely to be formed, and when used in milk, for example, aggregates of the inorganic polyvalent metal massively sediment at the bottom of the container, which is not preferable.

If the molar ratio of the alkali metal ion to the organic acid having a carboxyl group is less than 1, the dispersion state tends to be unstable and it is not preferable, or when the molar ratio exceeds 8, the alkalinity is too strong, and when a strong alkali is added to food, the favor is sacrificed.

For the preparation of the precursor of the present invention, there is no particular limitation with respect to the sequence of mixing water, the polyvalent metal compound, and the organic acid having a carboxyl group, and after the preparation of the precursor, the phosphoric acid source and the alkali metal are added in one or two or more methods selected from (a), (b), (c), (d) and (e) as described above.

Of these methods of adding the phosphoric acid source and the alkali metal, it is preferred to select either method (d) or (e) to obtain a food additive slurry composition of a superior dispersibility.

As the indispensable condition for the present invention, after preparing the precursor by mixing water, the polyvalent metal compound, and the organic acid having a carboxyl group, the phosphoric acid source and the alkali metal are added in at least one method of (a), (b), (c), (d) and (e), and stirred and mixed. If the sequence of addition of these components is changed, for example, if the phosphoric acid source and the alkali metal are added to water and the polyvalent metal compound, and then the organic acid having a carboxyl group is added and mixed, a food additive slurry composition having an excellent dispersibility cannot be prepared.

The temperature when mixing the components for producing the food additive slurry composition of the present invention is not particularly limited, but is preferably in a range of 1 to 70° C., or more preferably 10 to 40° C. for obtaining a food additive slurry composition of a superior dispersibility. It is preferred, after mixing all components, to heat to a temperature in a range of 80 to 230° C., since the dispersion tends to be stable for a longer period.

If the liquid temperature at the time of mixing is over 70° C. coarse particles are likely to be formed in the liquid, and it is hard to maintain a stable dispersion for a long period, or if the liquid temperature is lower than 1° C., the water used as a solvent is likely to be frozen, and it is hard to obtain a composition having an excellent dispersion.

The pH of the food additive slurry composition of the present invention is usually in a range of 5.5 to 12, and considering the dispersion stability in the food and effects of pH changes on flavor, it is preferably in a range of 5.5 to 8.0, more preferably 6.0 to 7.2. If the pH is less than 5.5 or over 12, a problem tends to occur in the dispersion stability. The food additive slurry composition of the present invention is excellent in dispersion stability in foods in a neutral to alkaline region, but in the food products in an acidic region such as yogurt, the dispersion stability is slightly inferior.

Therefore, to achieve dispersion stability in an acidic region or to maintain the dispersion stability for a longer period in canned beverages, it is preferred to manufacture according to a second method of the present invention by adding an emulsification stabilizer in an amount of 2 to 80 parts by weight to 100 parts by weight of a solid content of a food additive slurry composition [hereinafter referred to as a food additive slurry composition (α)] containing a polyvalent metal, a phosphoric acid ion, an organic acid having a carboxyl group and an alkali metal obtained in the above method, and dispersing the resulting mixed slurry by using a grinding machine and/or a dispersing machine to obtain a food additive slurry composition [hereinafter referred to as a food additive slurry composition (β)].

If the amount of the emulsification stabilizer is less than 2 parts by weight to 100 parts by weight of the solid content of the food additive slurry composition (α). if the food additive slurry composition (β) is added and used in canned juice, liquid yogurt or similar food products, it is hard to maintain emulsion stability for a long period, or to achieve dispersion stability effect in food in an acidic region, or if exceeding 80 parts by weight, the product viscosity is raised and the smoothness of drinking is sacrificed, and further as the product viscosity becomes higher, handling is difficult in manufacture at high concentrations, and the solid content concentration must be lowered, and it is not economical.

Examples of the emulsification stabilizer usable in the present invention include gellan gum, carrageenan, soda arginate, guar gum, gumkaraya, carboxymethyl cellulose (CMC). propylene glycol ester arginate (PGA), gum arabic, tamarind gum, gum ghatti, gum tragacanth, xanthan gum, pullulan, cassia gum, locust bean gum, arabinogalactan, sclerogum, condensed phosphoric acid salts, sucrose fatty acid esters with 8 or more HLBs, polyglyceride fatty acid esters, lecithin, processed starch, and soybean polysaccharide, and they can be used either alone or in combination of two or more. To obtain dispersion stability for a longer period, it is preferred to use at least one selected from the group consisting of sucrose fatty acid ester with 8 or more HLBs, PGA, CMC, gum arabic, arabinogalactan, condensed phosphoric acid salts, polyglyceride fatty acid esters, lecithin, and processed starch.

The grinding machine and/or dispersing machine used in the present invention is not particularly specified, and Dyno mill, sand mill, Kovor mill, and other wet grinding machines, and ultrasonic dispersing machine, Nanomizer, Microfluidizer, Ultimizer, homogenizer and other emulsifying and dispersing machines are preferably used.

By pulverizing and drying the food additive slurry compositions ($\alpha$) and ($\beta$) prepared in these manners, food additive powder compositions ($\alpha$) and ($\beta$) of the third invention are prepared. When drying the food additive slurry compositions ($\alpha$) and ($\beta$), the dryer is not particularly specified, but it is preferred to dry in a short time as far as possible from the viewpoint of prevention of degeneration of various surface treating agents, and from this viewpoint, therefore, it is preferred to use a spray dryer, a slurry dryer using ceramic medium in heated fluid state, other liquid spray type dryers, and a vacuum dryer.

In the particle size distribution of food additive compositions ($\alpha$), ($\beta$) of the present invention, the weight-average diameter K ($\mu$m) is preferred to satisfy the following condition ($\chi$), and in the food application demanding storage dispersion stability for a considerably long period, it is preferred to satisfy the condition ($\psi$), more preferably the condition ($\omega$).

($\chi$) $0.01 \leq K \leq 0.8$ ($\psi$) $0.01 \leq K \leq 0.3$ ($\omega$) $0.01 \leq K \leq 0.1$ If the weight-average diameter in the particle size distribution of food additive compositions ($\alpha$), ($\beta$) is larger than 0.8 $\mu$m, they are likely to sediment, and these food additive compositions ($\alpha$), ($\beta$) cannot be used in long storage food products. If it is too small, on the other hand, the solubility of minerals tends to increase, and when added in milk, for example, the protein in the milk is likely to aggregate, and hence it is preferred to be 0.01 $\mu$m or more.

The weight-average diameter in particle size distribution of the food additive compositions ($\alpha$), ($\beta$) in the present invention is measured and calculated in the following manner:

Measuring apparatus: SA-CP4 of Shimadzu Corporation

Preparation of samples: Food additive compositions ($\alpha$), ($\beta$) are dropped in the following solvent at 20° C., and samples for measuring particle size distribution are obtained.

Solvent: Ion exchanged water

Preliminary dispersion: Ultrasonic dispersion for 60 seconds by using a ultrasonic homogenizer (manufactured by Nippon Seiki)

Measuring temperature: 20.0±2.5° C.

Incidentally, when water soluble inorganic or organic calcium is added in milk or other foods, soluble calcium ions are likely to impede stability of protein in the milk, and more than a specific content cannot be added, but the food additive compositions ($\alpha$), ($\beta$) in the present invention are compositions having both organic form and inorganic form, and the calcium ion concentration in the food additive compositions ($\alpha$), ($\beta$) is extremely low, and when added in milk or other foods, the problem experienced when soluble inorganic or organic calcium is added does not occur.

The calcium ion concentration in the present invention is measured and calculated in the following manner:

Measuring apparatus. Ion Meter IM-40S of Toa Dempa Kogyo

Preparation of samples: Food additive compositions ($\alpha$), ($\beta$) are prepared in 7% by weight, and centrifuged for 1 hour at 10,000 rpm, and the obtained supernatant is used as a sample.

Solvent: Ion exchanged water.

The food additive compositions ($\alpha$), ($\beta$) prepared in the above-mentioned method are extremely excellent in re-dispersion in water, and are easily dispersed in water without using a particular dispersing machine or agitating machine.

Therefore, by using the food additive compositions ($\alpha$), ($\beta$) of the present invention, when preparing food, for example, mineral-enriched milk, the food additive compositions ($\alpha$), ($\beta$) prepared by the method of the present invention are directly added to the milk and stirred firmly to disperse the food additive compositions ($\alpha$), ($\beta$) in the milk, or a water dispersion of minerals obtained by dispersing the food additive compositions ($\alpha$), ($\beta$) preliminarily in water may be added to the milk. In reduced milk, the food additive compositions ($\alpha$), ($\beta$) of the present invention may be added to butter or butter oil melted at a temperature of approximately 60° C., and stirred at high speed and dispersed, and reduced skimmed milk or skimmed milk may be added thereto and homogenized.

In the mineral-enriched milk prepared in these methods, the amount of minerals removed by a clarifier is substantially decreased as compared with the case of adding minerals prepared by the conventional method. That is, minerals are held very stably in the milk, yogurt or juice containing the food additive compositions ($\alpha$), ($\beta$) of the present invention. Moreover, since the food additive compositions ($\alpha$), ($\beta$) of the present invention are excellent in dispersion of minerals, the required stirring time is short when adding to milk, and aggregation of minerals does not occur as seen in the case of long-term stirring in butter. Further, if the food additive slurry compositions ($\alpha$), ($\beta$) of the present invention and powder compositions thereof are added abundantly in milk or cream, there is no change in flavor or taste of products such as peculiar taste or smell noted in water soluble calcium compound or gelation of products.

Aside from the above applications, the food additive compositions ($\alpha$), ($\beta$) of the present invention can be used in cream, soup, coffee, tea, oolong tea, soybean milk, sports drink, near-water, other liquid foods, wine, sake, other alcoholic drinks, cheese, gum, bread, candies, noodles, other foods and tablets for mineral-enriching purposes.

There is no problem if the food additive compositions ($\alpha$), ($\beta$) of the present invention are used together with water soluble inorganic or organic minerals such as calcium lactate, calcium chloride, magnesium chloride, and ammonium ferric citrate, or water insoluble inorganic minerals such as calcium carbonate, calcium phosphate, dolomite, trimagnesium phosphate, and ferric pyrophosphate.

The present invention will be described in more detail below by presenting examples and comparative examples, but it must be noted that the present invention is not limited to these examples. In the following description, the percentage refers to percent by weight, unless otherwise noted.

EXAMPLE 1

A precursor was prepared by mixing and stirring 1142.9 g of water, 155.4 g of calcium hydroxide, and 192 g of citric acid (anhydrous). To the precursor, 343 g of 40% phosphoric acid was added and stirred, and 224 g of 50% potassium hydroxide was finally added, and stirred sufficiently, and a food additive slurry composition was prepared. The temperature when mixing the slurry was 50° C. Next, using an autoclave, the slurry was heated for 30 minutes at 120° C., and a food additive slurry composition was prepared. The molar ratio of components was calcium hydroxide:citric acid: phosphoric acid ion:alkali metal of 2.1:1.0:1.4:2.0.

The weight-average diameter in particle size distribution of a food additive in the food additive slurry composition was 0.11 μm. The solid content concentration of the food additive slurry composition was 25.1%. The calcium ion concentration in the food additive slurry composition was 0 mg/L.

The viscosity of the obtained food additive slurry composition was sufficiently low, and there was no problem at all in fluidity.

EXAMPLE 2

A precursor was prepared by mixing and stirring 1142.9 g of water, 155.4 g of calcium hydroxide, and 192 g of citric acid (anhydrous). To the precursor, 609.6 g of 40% dipotassium hydrogenphosphate was added and stirred, and 112 g of 50% potassium hydroxide was finally added, and stirred sufficiently, and a food additive slurry composition was prepared. The temperature when mixing the slurry was 50° C. Next, using an autoclave, the slurry was heated for 30 minutes at 120° C., and a food additive slurry composition was prepared. The molar ratio of components was calcium hydroxide:citric acid:phosphoric acid ion:alkali metal of 2.1:1.0:1.4:3.8.

The weight-average diameter in particle size distribution of a food additive in the food additive slurry composition was 0.14 μm. The solid content concentration of the food additive slurry composition was 24.3%. The calcium ion concentration in the food additive slurry composition was 0 mg/L.

The viscosity of the obtained food additive slurry composition was sufficiently low, and there was no problem at all in fluidity.

EXAMPLE 3

A precursor was prepared by mixing and stirring 1142.9 g of water, 155.4 g of calcium hydroxide, and 192 g of citric acid (anhydrous). The precursor and 742.9 g of 40% tripotassium phosphate were mixed and stirred sufficiently, and a food additive slurry composition was prepared. The temperature when mixing the slurry was 50° C. Next, using an autoclave, the slurry was heated for 30 minutes at 120° C., and a food additive slurry composition was prepared. The molar ratio of components was calcium hydroxide:citric acid: phosphoric acid ion:alkali metal of 2.1:1.0:1.4:4.2.

The weight-average diameter in particle size distribution of food additive in the food additive slurry composition was 0.17 μm. The solid content concentration of the food additive slurry composition was 23.9%. The calcium ion concentration in the food additive slurry composition was 0 mg/L.

The viscosity of the obtained food additive slurry composition was sufficiently low, and there was no problem at all in fluidity.

EXAMPLE 4

A food additive slurry composition was prepared in the same manner as in Example 1 except that phosphoric acid and potassium hydroxide were added simultaneously to the precursor prepared by mixing and stirring water, calcium hydroxide and citric acid (anhydrous). The molar ratio of components was calcium hydroxide:citric acid:phosphoric acid ion:alkali metal of 2.1:1.0:1.4:2.0.

The weight-average diameter in particle size distribution of food additive in the food additive slurry composition was 0.15 μm. The solid content concentration of the food additive slurry composition was 25.0%. The calcium ion concentration in the food additive slurry composition was 0 mg/L.

The viscosity of the obtained food additive slurry composition was sufficiently low, and there was no problem at all in fluidity.

EXAMPLE 5

A food additive slurry composition was prepared in the same manner as in Example 2 except that dipotassium phosphate and potassium hydroxide were added simultaneously to the precursor prepared by mixing and stirring water, calcium hydroxide and citric acid (anhydrous). The molar ratio of components was calcium hydroxide:citric acid:phosphoric acid ion:alkali metal of 2.1:1.0:1.4:3.8.

The weight-average diameter in particle size distribution of food additive in the food additive slurry composition was 0.18 μm. The solid content concentration of the food additive slurry composition was 24.3%. The calcium ion concentration in the food additive slurry composition was 0 mg/L.

The viscosity of the obtained food additive slurry composition was sufficiently low, and there was no problem at all in fluidity.

EXAMPLE 6

A food additive slurry composition was prepared in the same manner as in Example 1 except that the molar ratio of components was changed as follows. That is, the molar ratio of components was calcium hydroxide:citric acid:phosphoric acid ion:alkali metal of 2.8:1.0:2.1:2.8.

The weight-average diameter in particle size distribution of food additive in the food additive slurry composition was 0.25 μm. The solid content concentration of the food additive slurry composition was 28.6%. The calcium ion concentration in the food additive slurry composition was 0.2 mg/L.

The viscosity of the obtained food additive slurry composition was sufficiently low, and there was no problem at all in fluidity.

EXAMPLE 7

A food additive slurry composition was prepared in the same manner as in Example 1 except that the molar ratio of components was changed as follows. That is, the molar ratio of components was calcium hydroxide:citric acid:phosphoric acid ion:alkali metal of 3.3:1.0:2.7:4.2.

The weight-average diameter in particle size distribution of food additive in the food additive slurry composition was 0.32 μm. The solid content concentration of the food additive slurry composition was 30.2%. The calcium ion concentration in the food additive slurry composition was 0.2 mg/L.

The viscosity of the obtained food additive slurry composition was sufficiently low, and there was no problem at all in fluidity.

EXAMPLE 8

A food additive slurry composition was prepared in the same manner as in Example 2 except that the molar ratio of components was changed as follows. That is, the molar ratio of components was calcium hydroxide:citric acid:phosphoric acid ion:alkali metal of 2.5:1.0:2.1:5.0.

The weight-average diameter in particle size distribution of food additive in the food additive slurry composition was 0.24 μm. The solid content concentration of the food additive slurry composition was 26.2%. The calcium ion concentration in the food additive slurry composition was 0.2 mg/L.

The viscosity of the obtained food additive slurry composition was sufficiently low, and there was no problem at all in fluidity.

EXAMPLE 9

A food additive slurry composition was prepared in the same manner as in Example 1 except that calcium oxide was used instead of calcium hydroxide. The molar ratio of components was calcium oxide:citric acid:phosphoric acid ion:alkali metal of 2.1:1.0:1.4:2.0.

Next, the food additive slurry composition was concentrated by the use of a concentrating machine to thus prepare a food additive slurry composition having a solid content concentration of 35.5%.

The weight-average diameter in particle size distribution of food additive in the food additive slurry composition was 0.59 μm. The calcium ion concentration in the food additive slurry composition was 0.8 mg/L.

The viscosity of the obtained food additive slurry composition was sufficiently low, and there was no problem at all in fluidity.

EXAMPLE 10

A food additive slurry composition was prepared in the same manner as in Example 1 except that calcium carbonate was used instead of calcium hydroxide. The molar ratio of components was calcium carbonate:citric acid:phosphoric acid ion:alkali metal of 2.1:1.0:1.4:2.0.

The weight-average diameter in particle size distribution of food additive in the food additive slurry composition was 0.16 μm. The solid content concentration of the food additive slurry composition was 25.3%. The calcium ion concentration in the food additive slurry composition was 0.1 mg/L.

The viscosity of the obtained food additive slurry composition was sufficiently low, and there was no problem at all in fluidity.

EXAMPLE 11

A food additive slurry composition was prepared in the same manner as in Example 1 except that the temperature at the time of mixing was changed to 20° C. The molar ratio of components was calcium hydroxide:citric acid:phosphoric acid ion:alkali metal of 2.1:1.0:1.4:2.0.

The weight-average diameter in particle size distribution of food additive in the food additive slurry composition was 0.08 μm. The solid content concentration of the food additive slurry composition was 24.8%. The calcium ion concentration in the food additive slurry composition was 0 mg/L.

The viscosity of the obtained food additive slurry composition was sufficiently low, and there was no problem at all in fluidity.

EXAMPLE 12

A food additive slurry composition was prepared in the same manner as in Example 1 except that the procedure for heating the slurry for 30 minutes at 120° C. in an autoclave was not carried out. The molar ratio of components was calcium hydroxide:citric acid:phosphoric acid ion:alkali metal of 2.1:1.0:1.4:2.0.

The weight-average diameter in particle size distribution of food additive in the food additive slurry composition was 0.38 μm. The solid content concentration of the food additive slurry composition was 25.2%. The calcium ion concentration in the food additive slurry composition was 0.3 mg/L.

The viscosity of the obtained food additive slurry composition was sufficiently low, and there was no problem at all in fluidity.

EXAMPLE 13

A food additive slurry composition was prepared in the same manner as in Example 1 except that 81.4 g of calcium hydroxide and 58.3 g of magnesium hydroxide were used instead of 155.4 g calcium hydroxide. The molar ratio of components was calcium hydroxide:magnesium hydroxide:citric acid:phosphoric acid ion:alkali metal of 1.1:1.0:1.0:1.4:2.0.

The weight-average diameter in particle size distribution of food additive in the food additive slurry composition was 0.28 μm. The solid content concentration of the food additive slurry composition was 24.4%. The calcium ion concentration in the food additive slurry composition was 0.5 mg/L.

The viscosity of the obtained food additive slurry composition was sufficiently low, and there was no problem at all in fluidity.

EXAMPLE 14

A food additive slurry composition was prepared in the same manner as in Example 1 except that 151.7 g calcium hydroxide and 4.5 g ferrous hydroxide were used instead of 155.4 g of calcium hydroxide. The molar ratio of components was calcium hydroxide:ferrous hydroxide:citric acid:phosphoric acid ion:alkali metal of 2.05:0.05:1.0:1.4:2.0.

The weight-average diameter in particle size distribution of food additive in the food additive slurry composition was 0.26 μm. The solid content concentration of the food additive slurry composition was 25.0%. The calcium ion concentration in the food additive slurry composition was 0.3 mg/L.

The viscosity of the obtained food additive slurry composition was sufficiently low, and there was no problem at all in fluidity.

EXAMPLE 15

A food additive slurry composition was prepared in the same manner as in Example 1 except that 112 g of 50% potassium hydroxide and 80 g of 50% sodium hydroxide were used instead of 224 g of 50% potassium hydroxide. The molar ratio of components was calcium hydroxide:citric acid:phosphoric acid:potassium hydroxide:sodium hydroxide of 2.1:1.0:1.4:1.0:1.0.

The weight-average diameter in particle size distribution of food additive in the food additive slurry composition was 0.17 μm. The solid content concentration of the food additive slurry composition was 24.7%. The calcium ion concentration in the food additive slurry composition was 0.2 mg/L.

The viscosity of the obtained food additive slurry composition was sufficiently low, and there was no problem at all in fluidity.

EXAMPLE 16

A food additive powder composition was prepared by drying the food additive slurry composition obtained in Example 1 by using a spray dryer. To 100 parts by weight of the food additive powder composition, 20 parts by weight of polyglycerin fatty acid ester and water were added, and stirred and mixed, and a mixed slurry of a food additive composition having a solid content concentration of 35% was prepared, and ground in wet process by using a wet grinding machine Dyno Mill KD Pilot Type (manufactured by WAB), and a food additive slurry composition was obtained. The weight-average diameter in particle size distribution of food additive in the food additive slurry composition was 0.03 µm. The calcium ion concentration in the food additive slurry composition was 0.2 mg/L.

The viscosity of the obtained high concentration food additive slurry was sufficiently low, and there was no problem at all in fluidity.

EXAMPLE 17

A food additive powder composition was prepared by drying the food additive slurry composition obtained in Example 1 by using a spray dryer. To 100 parts by weight of the food additive powder composition, 10 parts by weight of propylene glycol ester arginate and water were added, and stirred and mixed, and a mixed slurry of a food additive composition having a solid content concentration of 30% was prepared, and dispersed by using a homogenizer at a pressure of 150 kg/cm$^2$, and a food additive slurry composition was obtained. The weight-average diameter in particle size distribution of food additive in the food additive slurry composition was 0.05 µm. The calcium ion concentration in the-food additive slurry composition was 0.3 mg/L.

The viscosity of the obtained high concentration food additive slurry was sufficiently low, and there was no problem at all in fluidity.

Comparative Example 1

A food additive slurry composition was prepared according to the method of Example 71 disclosed in Japanese Unexamined Patent Publication No. Sho 55-84327.

That is, after mixing and stirring 3866 g of water and 296.0 g of calcium hydroxide, 224 g of potassium hydroxide was mixed and stirred, and 229.8 g of 85.3% phosphoric acid was added and stirred, and finally 384 g of citric acid (anhydrous) was added, and stirred sufficiently, and a food additive slurry composition was prepared. The temperature when mixing the slurry was 30° C. Next, using an autoclave, the slurry was heated for 30 minutes at 200° F. (approximately 93° C.), and a food additive slurry composition was prepared. The molar ratio of components was calcium hydroxide:citric acid:phosphoric acid ion:alkali metal of 2.0:1.0:1.0:2.0.

The weight-average diameter in particle size distribution of food additive in the food additive slurry composition was 1.45 µm. The solid content concentration of the food additive slurry composition was 11.0%. The calcium ion concentration in the food additive slurry composition was 1.0 mg/L.

The viscosity of the obtained food additive slurry composition was sufficiently low, and there was no problem at all in fluidity.

Comparative Example 2

A food additive slurry composition was prepared according to the method of Example 84 disclosed in Japanese Unexamined Patent Publication No. Sho 55-84327.

That is, after mixing and stirring 8700 g of water and 192.4 g of calcium hydroxide, 551.9 g of tripotassium phosphate was mixed and stirred, and finally 499.2 g of citric acid (anhydrous) was added, and stirred sufficiently, and a food additive slurry composition was prepared. The temperature when mixing the slurry was 30° C. Next, using an autoclave, the slurry was heated for 30 minutes at 200° F. (approximately 93° C.), and a food additive slurry composition was prepared. The molar ratio of components was calcium hydroxide:citric acid:phosphoric acid ion:alkali metal of 1.0:1.0:1.0:3.0.

The weight-average diameter in particle size distribution of food additive in the food additive slurry composition was 1.05 µm. The solid content concentration of the food additive slurry composition was 12.5%. The calcium ion concentration in the food additive slurry composition was 1.2 mg/L.

The viscosity of the obtained food additive slurry composition was sufficiently low, and there was no problem at all in fluidity.

Comparative Example 3

The food additive slurry composition prepared in Comparative Example 1 was let stand still for 24 hours at 20° C. As a result, the food additive slurry composition was separated into two layers, that is, a turbid liquid layer and a sediment layer. The turbid liquid layer was taken out, and left to stand still for further 24 hours, it was separated again into a turbid liquid layer and a sediment layer. The turbid liquid layer was concentrated by using a concentrating machine, and a food additive slurry composition having a solid content concentration of 36% was prepared.

The weight-average diameter in particle size distribution of food additive in the food additive slurry composition was 0.12 µm. The calcium ion concentration in the food additive slurry composition was 0.3 mg/L.

As mentioned above, Comparative Example 3 is a food additive slurry composition prepared by taking out and concentrating the supernatant of Comparative Example 1, but the dispersion state of the obtained composition was quite different, and the composition of an-extremely good dispersion state was obtained. However, as a result of measurement of the calcium content in the obtained food additive slurry composition, it was 15% of the charged amount, and thus the yield was very poor.

Comparative Example 4

A food additive slurry composition was prepared in the same method as in Comparative Example 3 except that the food additive slurry composition prepared in Comparative Example 2 was used.

The weight-average diameter in particle size distribution of food additive in the food additive slurry composition was 0.09 µm. The calcium ion concentration in the food additive slurry composition was 0.2 mg/L.

As a result of measurement of a calcium content in the obtained food additive slurry composition, it was 17% of the charged amount, and thus the yield was very poor.

Comparative Example 5

A food additive slurry composition was prepared in the same manner as in Example 1 except that the adding sequence was changed, that is, after mixing and stirring 1142.9 g of water and 155.4 g of calcium hydroxide, 224 g of 50% potassium hydroxide was mixed and stirred, then 343 g of 40% phosphoric acid was added and stirred, and finally 192 g of citric acid (anhydrous) was added.

The molar ratio of components was calcium hydroxide:citric acid:phosphoric acid:alkali metal of 2.1:1.0:1.4:1.0:2.0.

The weight-average diameter in particle size distribution of food additive in the food additive slurry composition was 1.71 μm. The solid content concentration of the food additive slurry composition was 25.0%. The calcium ion concentration in the food additive slurry composition was 1.3 mg/L.

As mentioned above, though Comparative Example 5 is a food additive slurry composition prepared by using the same materials as in Example 1 at the same ratio, changing only the sequence of adding them, the dispersion state of the obtained composition was quite different, and the composition of an extremely poor dispersion state was obtained.

Comparative Example 6

A food additive slurry composition was prepared in the same manner as in Example 1 except that the adding sequence was changed, that is, after mixing and stirring 1142.9 g of water and 155.4 g of calcium hydroxide, 609.6 g of dipotassium hydrogenphosphate was mixed and stirred, and finally 192 g of citric acid (anhydrous) was added.

The molar ratio of components was calcium hydroxide:citric acid:phosphoric acid:alkali metal of 2.1:1.0:1.4:3.8.

The weight-average diameter in particle size distribution of food additive in the food additive slurry composition was 1.63 μm. The solid content concentration of the food additive slurry composition was 24.3%. The calcium ion concentration in the food additive slurry composition was 1.5 mg/L.

Comparative Example 7

A food additive slurry composition was prepared in the same manner as in Comparative Example 5 except that the molar ratio of components was changed as follows. That is, the molar ratio of components was calcium hydroxide:citric acid:phosphoric acid ion:alkali metal of 3.3:1.0:2.7:4.2.

The weight-average diameter in particle size distribution of food additive in the food additive slurry composition was 2.82 μm. The solid content concentration of the food additive slurry composition was 30.3%. The calcium ion concentration in the food additive slurry composition was 2.2 mg/L.

Comparative Example 8

A food additive slurry composition was prepared in the same manner as in Comparative Example 5 except that calcium oxide was used instead of calcium hydroxide. The molar ratio of components was calcium oxide:citric acid:phosphoric acid ion:alkali metal of 2.1:1.0:1.4:2.0.

Next, the food additive slurry composition was concentrated by the use of a concentrating machine to thus prepare a food additive slurry composition having a solid content concentration of 23.6%.

The weight-average diameter in particle size distribution of food additive in the food additive slurry composition was 2.62 μm. The calcium ion concentration in the food additive slurry composition was 1.8 mg/L.

Comparative Example 9

A food additive slurry composition was prepared in the same manner as in Comparative Example 5 except that calcium carbonate was used instead of calcium hydroxide. The molar ratio of components was calcium carbonate:citric acid:phosphoric acid ion:alkali metal of 2.1:1.0:1.4:2.0.

The weight-average diameter in particle size distribution of food additive in the food additive slurry composition was 1.99 μm. The solid content concentration of the food additive slurry composition was 26.9%. The calcium ion concentration in the food additive slurry composition was 1.1 mg/L.

Comparative Example 10

A food additive slurry composition was prepared in the same manner as in Comparative Example 5 except that the temperature at the time of mixing was changed to 20° C. The molar ratio of components was calcium hydroxide:citric acid:phosphoric acid ion:alkali metal of 2.1:1.0:1.4:2.0.

The weight-average diameter in particle size distribution of food additive in the food additive slurry composition was 1.53 μm. The solid content concentration of the food additive slurry composition was 24.0% . The calcium ion concentration in the food additive slurry composition was 1.3 mg/L.

Comparative Example 11

A food additive slurry composition was prepared in the same manner as in Comparative Example 5 except that 81.4 g of calcium hydroxide and 58.3 g of magnesium hydroxide were used instead of 155.4 g calcium hydroxide. The molar ratio of components was calcium hydroxide:magnesium hydroxide:citric acid:phosphoric acid ion:alkali metal of 1.1:1.0:1.0:1.4:2.0.

The weight-average diameter in particle size distribution of food additive in the food additive slurry composition was 2.78 μm. The solid content concentration of the food additive slurry composition was 24.4%. The calcium ion concentration in the food additive slurry composition was 1.6 mg/L.

Comparative Example 12

A food additive slurry composition was prepared in the same manner as in Comparative Example 5 except that 151.7 g calcium hydroxide and 4.5 g ferrous hydroxide were used instead of 155.4 g of calcium hydroxide. The molar ratio of components was calcium hydroxide:ferrous hydroxide:citric acid:phosphoric acid ion:alkali metal of 2.05:0.05:1.0:1.4:2.0.

The weight-average diameter in particle size distribution of food additive in the food additive slurry composition was 2.38 μm. The solid content concentration of the food additive slurry composition was 24.3%. The calcium ion concentration in the food additive slurry composition was 2.1 mg/L.

TABLE 1

| | Muetivalent metal compound A | Organic acid B | Phosphoric acid source C | Alkali metal compound D | A/B Molar ratio | C/B Molar ratio | D/B Molar ratio | Temp. (° C.) | Emulsification stabilizer | Solid content % | Weight-average diameter K (μm) | Production method |
|---|---|---|---|---|---|---|---|---|---|---|---|---|
| Ex. 1 | Ca(OH)$_2$ | Citric acid | Phosphoric acid | KOH | 2.1:1 | 1.4:1 | 2.0:1 | 50 | — | 25.1 | 0.11 | e |
| Ex. 2 | Ca(OH)$_2$ | Citric acid | Dipotassium hydrogenphosphate | KOH | 2.1:1 | 1.4:1 | 3.8:1 | 50 | — | 24.3 | 0.14 | d |
| Ex. 3 | Ca(OH)$_2$ | Citric acid | Tripotassium phosphate | — | 2.1:1 | 1.4:1 | 4.2:1 | 50 | — | 23.9 | 0.17 | a |
| Ex. 4 | Ca(OH)$_2$ | Citric acid | Phosphoric acid | KOH | 2.1:1 | 1.4:1 | 2.0:1 | 50 | — | 25.0 | 0.15 | b |
| Ex. 5 | Ca(OH)$_2$ | Citric acid | Dipotassium hydrogenphosphate | KOH | 2.1:1 | 1.4:1 | 3.8:1 | 50 | — | 24.3 | 0.18 | c |
| Ex. 6 | Ca(OH)$_2$ | Citric acid | Phosphoric acid | KOH | 2.8:1 | 2.1:1 | 2.8:1 | 50 | — | 28.6 | 0.25 | e |
| Ex. 7 | Ca(OH)$_2$ | Citric acid | Phosphoric acid | KOH | 3.3:1 | 2.7:1 | 4.2:1 | 50 | — | 30.2 | 0.32 | e |
| Ex. 8 | Ca(OH)$_2$ | Citric acid | Dipotassium hydrogenphosphate | KOH | 2.5:1 | 2.1:1 | 5.0:1 | 50 | — | 26.2 | 0.24 | d |
| Ex. 9 | CaO | Citric acid | Phosphoric acid | KOH | 2.1:1 | 1.4:1 | 2.0:1 | 50 | — | 35.5 | 0.59 | e |
| Ex. 10 | CaCO$_3$ | Citric acid | Phosphoric acid | KOH | 2.1:1 | 1.4:1 | 2.0:1 | 50 | — | 25.3 | 0.16 | e |
| Ex. 11 | Ca(OH)$_2$ | Citric acid | Phosphoric acid | KOH | 2.1:1 | 1.4:1 | 2.0:1 | 20 | — | 24.8 | 0.08 | e |
| Ex. 12 | Ca(OH)$_2$ | Citric acid | Phosphoric acid | KOH | 2.1:1 | 1.4:1 | 2.0:1 | 50 | — | 25.2 | 0.38 | e |
| Ex. 13 | Ca(OH)$_2$ Mg(OH)$_2$ | Citric acid | Phosphoric acid | KOH | 2.1:1 | 1.4:1 | 2.0:1 | 50 | — | 24.4 | 0.28 | e |
| Ex. 14 | Ca(OH)$_2$ Fe(OH)$_2$ | Citric acid | Phosphoric acid | KOH | 2.1:1 | 1.4:1 | 2.0:1 | 50 | — | 25.0 | 0.26 | e |
| Ex. 15 | Ca(OH)$_2$ | Citric acid | Phosphoric acid | KOH NaOH | 2.1:1 | 1.4:1 | 2.0:1 | 50 | — | 24.7 | 0.17 | e |
| Ex. 16 | Ca(OH)$_2$ | Citric acid | Phosphoric acid | KOH | 2.1:1 | 1.4:1 | 2.0:1 | 50 | PG | 35.0 | 0.03 | e |
| Ex. 17 | Ca(OH)$_2$ | Citric acid | Phosphoric acid | KOH | 2.1:1 | 1.4:1 | 2.0:1 | 50 | PGA | 30.0 | 0.05 | e |

PG: Polyglycerin fatty acid ester
PGA: Propylene glycol ester arginate

Production Method

TABLE 2

| | Muetivalent metal compound A | Organic acid B | Phosphoric acid source C | Alkali metal compound D | A/B Molar ratio | C/B Molar ratio | D/B Molar ratio | Temp. (° C.) | Emulsification stabilizer | Solid content % | Weight-average diameter K (μm) |
|---|---|---|---|---|---|---|---|---|---|---|---|
| Comp. Ex. 1 | Ca(OH)$_2$ | Citric acid | Phosphoric acid | KOH | 2.0:1 | 1.0:1 | 2.0:1 | 30 | — | 11.0 | 1.45 |
| Comp. Ex. 2 | Ca(OH)$_2$ | Citric acid | Tripotassium phosphate | — | 1.0:1 | 1.0:1 | 3.0:1 | 30 | — | 12.5 | 1.05 |
| Comp. Ex. 3 | Ca(OH)$_2$ | Citric acid | Phosphoric acid | KOH | 2.0:1 | 1.0:1 | 2.0:1 | 30 | — | 36.0 | 0.12 |
| Comp. Ex. 4 | Ca(OH)$_2$ | Citric acid | Tripotassium phosphate | — | 1.0:1 | 1.0:1 | 3.0:1 | 30 | — | 36.0 | 0.09 |
| Comp. Ex. 5 | Ca(OH)$_2$ | Citric acid | Phosphoric acid | KOH | 2.1:1 | 1.4:1 | 2.0:1 | 50 | — | 25.0 | 1.71 |
| Comp. Ex. 6 | Ca(OH)$_2$ | Citric acid | Dipotassium hydrogenphosphate | KOH | 2.1:1 | 1.4:1 | 3.8:1 | 50 | — | 24.3 | 1.63 |
| Comp. Ex. 7 | Ca(OH)$_2$ | Citric acid | Phosphoric acid | KOH | 3.3:1 | 2.7:1 | 4.2:1 | 50 | — | 30.3 | 2.82 |
| Comp. Ex. 8 | CaO | Citric acid | Phosphoric acid | KOH | 2.1:1 | 1.4:1 | 2.0:1 | 50 | — | 23.6 | 2.62 |
| Comp. Ex. 9 | CaCO$_3$ | Citric acid | Phosphoric acid | KOH | 2.1:1 | 1.4:1 | 2.0:1 | 50 | — | 26.9 | 1.99 |
| Comp. Ex. 10 | Ca(OH)$_2$ | Citric acid | Phosphoric acid | KOH | 2.1:1 | 1.4:1 | 2.0:1 | 20 | — | 24.0 | 1.53 |
| Comp. Ex. 11 | Ca(OH)$_2$ Mg(OH)$_2$ | Citric acid | Phosphoric acid | KOH | 2.1:1 | 1.4:1 | 2.0:1 | 50 | — | 24.4 | 2.78 |
| Comp. Ex. 12 | Ca(OH)$_2$ Fe(OH)$_2$ | Citric acid | Phosphoric acid | KOH | 2.1:1 | 1.4:1 | 2.0:1 | 50 | — | 24.3 | 2.38 |

(a) Addition of an alkali metal phosphate and/or an alkali metal of condensed phosphoric acid.

(b) Simultaneous addition of an alkali metal phosphate and/or an alkali metal of condensed phosphoric acid, and an alkali metal salt.

(c) Simultaneous addition of phosphoric acid and/or condensed phosphoric acid, and an alkali metal salt.

(d) Addition of an alkali metal phosphate and/or an alkali metal of condensed phosphoric acid, and then addition of an alkali metal salt.

(e) Addition of phosphoric acid and/or condensed phosphoric acid, and then addition of an alkali metal salt.

EXAMPLES 18 TO 34

Comparative Examples 13 to 24

The food additive slurry compositions obtained by Examples 1 to 17 and Comparative Examples 1 to 12 were dried by the use of a spray dryer to thus obtain food additive powder compositions.

Next, to the food additive powder compositions obtained by Examples 18–34, water was added so that the solid content concentrations were almost identical to those of the slurry compositions before being powdered, and the mixtures were shaken for 10 minutes by the use of a shaker to thus prepare re-dispersed suspensions. The viscosities of the re-dispersed suspensions of the food additive powder compositions were nearly the same as those of the food additive slurry compositions before drying and fluidities were quite satisfactory.

The weight-average diameters in particle size distributions of the minerals contained in the re-dispersed suspensions are shown in Table 3.

TABLE 3

| | K | | K | | K | | K | | K |
|---|---|---|---|---|---|---|---|---|---|
| Ex. 18 | 0.11 | Ex. 19 | 0.15 | Ex. 20 | 0.20 | Ex. 21 | 0.15 | Ex. 22 | 0.18 |
| Ex. 23 | 0.16 | Ex. 24 | 0.22 | Ex. 25 | 0.26 | Ex. 26 | 0.62 | Ex. 27 | 0.17 |
| Ex. 28 | 0.08 | Ex. 29 | 0.37 | Ex. 30 | 0.26 | Ex. 31 | 0.27 | Ex. 32 | 0.18 |
| Ex. 33 | 0.03 | Ex. 34 | 0.05 | | | | | | |

K: Weight-average diameter (Unit: µm)

Next, to the food additive powder compositions obtained by Comparative Examples 13–24, water was added so that the solid content concentrations were almost identical to those of the slurry compositions before being powdered, and the mixtures were shaken for 10 minutes by the use of a shaker to thus prepare re-dispersed suspensions. The viscosities of the re-dispersed suspensions of the food additive powder compositions were nearly the same as those of the food additive slurry compositions before drying and fluidities were quite satisfactory.

The weight-average diameters in particle size distributions of the minerals contained in the re-dispersed suspensions are shown in Table 4.

TABLE 4

| | K | | K | | K | | K | | K |
|---|---|---|---|---|---|---|---|---|---|
| Comp. Ex. 13 | 1.46 | Comp. Ex. 14 | 1.05 | Comp. Ex. 15 | 0.13 | Comp. Ex. 16 | 0.09 | Comp. Ex. 17 | 1.74 |
| Comp. Ex. 18 | 1.65 | Comp. Ex. 19 | 2.96 | Comp. Ex. 20 | 2.67 | Comp. Ex. 21 | 1.92 | Comp. Ex. 22 | 1.71 |
| Comp. Ex. 23 | 2.78 | Comp. Ex. 24 | 2.35 | | | | | | |

K: Weight-average diameter (Unit: µm)

Next, the food additive slurry compositions prepared by Examples 1–17 and Comparative Examples 1–12 and the food additive powder compositions prepared by Examples 18 to 34 and Comparative Examples 13 to 24 were diluted to be 0.3% by weight in terms of the total mineral content. Each of the diluted suspensions was taken into a 100 ml measuring cylinder and left to stand at 10° C. to thus separate a transparent portion caused by precipitates of minerals and a colored portion dispersed by the minerals. Changes with time in the interfacial height and the amount of the precipitate were visually inspected and stability of each suspension in water was observed. Scale by ml was read and the results are shown by the following 5-rank evaluation in Tables 5 and 6.

(Interfacial height)
Interfacial height is not less than 98 ml and not more than 100 ml: 5
Interfacial height is not less than 95 ml and less than 98 ml: 4
Interfacial height is not less than 90 ml and less than 95 ml: 3
Interfacial height is not less than 50 ml and less than 90 ml: 2
Interfacial height is less than 50 ml: 1

(Amount of precipitate)
Precipitate is rarely observed: 5
Precipitate slightly observed: 4
Precipitate in less than 0.5 mm is observed: 3
Precipitate in not less than 0.5 mm and less than 2 mm is observed: 2
Precipitate in not less than 2 mm is observed: 1

TABLE 5

| | Interfacial height After | | | Amount of precipitate After | | |
|---|---|---|---|---|---|---|
| | 1 day | 3 days | 7 days | 1 day | 3 days | 7 days |
| Example 1 | 5 | 5 | 5 | 5 | 5 | 5 |
| Example 2 | 5 | 5 | 5 | 5 | 5 | 5 |
| Example 3 | 5 | 5 | 5 | 5 | 5 | 5 |
| Example 4 | 5 | 5 | 5 | 5 | 5 | 5 |
| Example 5 | 5 | 5 | 5 | 5 | 5 | 5 |

TABLE 5-continued

| | Interfacial height After | | | Amount of precipitate After | | |
|---|---|---|---|---|---|---|
| | 1 day | 3 days | 7 days | 1 day | 3 days | 7 days |
| Example 6 | 5 | 5 | 4 | 5 | 5 | 4 |
| Example 7 | 5 | 4 | 3 | 5 | 4 | 4 |
| Example 8 | 5 | 5 | 4 | 5 | 5 | 4 |
| Example 9 | 5 | 4 | 4 | 5 | 4 | 4 |
| Example 10 | 5 | 5 | 5 | 5 | 5 | 5 |
| Example 11 | 5 | 5 | 5 | 5 | 5 | 5 |
| Example 12 | 5 | 5 | 4 | 5 | 5 | 4 |
| Example 13 | 5 | 5 | 5 | 5 | 5 | 5 |
| Example 14 | 5 | 5 | 5 | 5 | 5 | 5 |
| Example 15 | 5 | 5 | 5 | 5 | 5 | 5 |
| Example 16 | 5 | 5 | 5 | 5 | 5 | 5 |
| Example 17 | 5 | 5 | 5 | 5 | 5 | 5 |
| Example 18 | 5 | 5 | 5 | 5 | 5 | 5 |
| Example 19 | 5 | 5 | 5 | 5 | 5 | 5 |
| Example 20 | 5 | 5 | 5 | 5 | 5 | 5 |
| Example 21 | 5 | 5 | 5 | 5 | 5 | 5 |

TABLE 5-continued

| | Interfacial height After | | | Amount of precipitate After | | |
|---|---|---|---|---|---|---|
| | 1 day | 3 days | 7 days | 1 day | 3 days | 7 days |
| Example 22 | 5 | 5 | 5 | 5 | 5 | 5 |
| Example 23 | 5 | 5 | 4 | 5 | 5 | 4 |
| Example 24 | 5 | 4 | 3 | 5 | 4 | 4 |
| Example 25 | 5 | 5 | 4 | 5 | 5 | 4 |
| Example 26 | 5 | 4 | 4 | 5 | 4 | 4 |
| Example 27 | 5 | 5 | 5 | 5 | 5 | 5 |
| Example 28 | 5 | 5 | 5 | 5 | 5 | 5 |
| Example 29 | 5 | 5 | 4 | 5 | 5 | 4 |
| Example 30 | 5 | 5 | 5 | 5 | 5 | 5 |
| Example 31 | 5 | 5 | 5 | 5 | 5 | 5 |
| Example 32 | 5 | 5 | 5 | 5 | 5 | 5 |
| Example 33 | 5 | 5 | 5 | 5 | 5 | 5 |
| Example 34 | 5 | 5 | 5 | 5 | 5 | 5 |

TABLE 6

| | Interfacial height After | | | Amount of precipitate After | | |
|---|---|---|---|---|---|---|
| | 1 day | 3 days | 7 days | 1 day | 3 days | 7 days |
| Comp. Ex. 1 | 2 | 1 | 1 | 2 | 1 | 1 |
| Comp. Ex. 2 | 2 | 2 | 1 | 2 | 2 | 1 |
| Comp. Ex. 3 | 5 | 5 | 5 | 5 | 5 | 5 |
| Comp. Ex. 4 | 5 | 5 | 5 | 5 | 5 | 5 |
| Comp. Ex. 5 | 1 | 1 | 1 | 1 | 1 | 1 |
| Comp. Ex. 6 | 1 | 1 | 1 | 1 | 1 | 1 |
| Comp. Ex. 7 | 1 | 1 | 1 | 1 | 1 | 1 |
| Comp. Ex. 8 | 1 | 1 | 1 | 1 | 1 | 1 |
| Comp. Ex. 9 | 1 | 1 | 1 | 1 | 1 | 1 |
| Comp. Ex. 10 | 2 | 1 | 1 | 2 | 1 | 1 |
| Comp. Ex. 11 | 1 | 1 | 1 | 1 | 1 | 1 |
| Comp. Ex. 12 | 1 | 1 | 1 | 1 | 1 | 1 |
| Comp. Ex. 13 | 2 | 1 | 1 | 2 | 1 | 1 |
| Comp. Ex. 14 | 2 | 2 | 1 | 2 | 2 | 1 |
| Comp. Ex. 15 | 5 | 5 | 5 | 5 | 5 | 5 |
| Comp. Ex. 16 | 5 | 5 | 5 | 5 | 5 | 5 |
| Comp. Ex. 17 | 1 | 1 | 1 | 1 | 1 | 1 |
| Comp. Ex. 18 | 1 | 1 | 1 | 1 | 1 | 1 |
| Comp. Ex. 19 | 1 | 1 | 1 | 1 | 1 | 1 |
| Comp. Ex. 20 | 1 | 1 | 1 | 1 | 1 | 1 |
| Comp. Ex. 21 | 1 | 1 | 1 | 1 | 1 | 1 |
| Comp. Ex. 22 | 2 | 1 | 1 | 2 | 1 | 1 |
| Comp. Ex. 23 | 1 | 1 | 1 | 1 | 1 | 1 |
| Comp. Ex. 24 | 1 | 1 | 1 | 1 | 1 | 1 |

EXAMPLE 35

The food additive slurry composition prepared by Example 1 was weighed to be 300 g in terms of calcium and dispersed in 300 g of butter dissolved at 60° C. This dispersion was added with stirring into 9.45 Kg of skimmed milk and the mixture was sterilized to thus obtain a calcium-enriched milk. The calcium-enriched milk was taken into several measuring cylinders of 100 ml and they were stored at 5° C. The milk was taken out quietly periodically and a change with time in the amount of the precipitate at the bottom of the measuring cylinder was visually inspected. The results are shown by the following 5-rank evaluation in Table 7. Moreover, the calcium-enriched milk was subjected to a sensory test by 10 men and women by 5-rank evaluation with respect to flavor and an average value is also shown in Table 7.

(Amount of precipitate)
Precipitate is rarely observed: 5
Precipitate is slightly observed: 4
Precipitate in a small amount is observed: 3
Precipitation in a fairly large amount is observed: 2
Precipitate in a large amount is observed: 1
(Flavor)
Flavor is good: 5
Flavor is rarely concerned about: 4
Flavor is slightly concerned about (Incongruity is somewhat felt.): 3
Flavor is slightly bad (Unpleasantness is somewhat felt.): 2
Flavor is vely bad (Unpleasantness is strongly felt.): 1

EXAMPLES 36 TO 68

Comparative Examples 25 to 48

Mineral-enriched milks were obtained in the same manner as in Example 35, except that the food additive slurry compositions or the food additive powder compositions prepared by Examples 2 to 34 and Comparative Examples 1 to 24 were used and that each mineral concentration was adjusted to the same concentration as in Example 35. The inspection of the precipitate and the seosory test for flavor were performed in the same manner as in Example 35. The results are shown in Tables 7 and 8.

TABLE 7

| | Slurry or powder composition | Amount of precipitate After | | | Flavor |
|---|---|---|---|---|---|
| | | 3 day | 7 days | 14 days | |
| Example 35 | Product of Ex. 1 | 5 | 5 | 5 | 3 |
| Example 36 | Product of Ex. 2 | 5 | 5 | 5 | 3 |
| Example 37 | Product of Ex. 3 | 5 | 5 | 4 | 2 |
| Example 38 | Product of Ex. 4 | 5 | 5 | 4 | 3 |
| Example 39 | Product of Ex. 5 | 5 | 5 | 4 | 3 |
| Example 40 | Product of Ex. 6 | 5 | 4 | 4 | 3 |
| Example 41 | Product of Ex. 7 | 5 | 4 | 3 | 2 |
| Example 42 | Product of Ex. 8 | 5 | 5 | 4 | 2 |
| Example 43 | Product of Ex. 9 | 4 | 3 | 3 | 3 |
| Example 44 | Product of Ex. 10 | 5 | 5 | 5 | 3 |
| Example 45 | Product of Ex. 11 | 5 | 5 | 5 | 3 |
| Example 46 | Product of Ex. 12 | 4 | 4 | 3 | 3 |
| Example 47 | Product of Ex. 13 | 5 | 5 | 4 | 3 |
| Example 48 | Product of Ex. 14 | 5 | 5 | 5 | 3 |
| Example 49 | Product of Ex. 15 | 5 | 5 | 5 | 3 |
| Example 50 | Product of Ex. 16 | 5 | 5 | 5 | 4 |
| Example 51 | Product of Ex. 17 | 5 | 5 | 5 | 4 |
| Example 52 | Product of Ex. 18 | 5 | 5 | 5 | 3 |
| Example 53 | Product of Ex. 19 | 5 | 5 | 5 | 3 |
| Example 54 | Product of Ex. 20 | 5 | 5 | 4 | 2 |
| Example 55 | Product of Ex. 21 | 5 | 5 | 4 | 3 |
| Example 56 | Product of Ex. 22 | 5 | 5 | 4 | 3 |
| Example 57 | Product of Ex. 23 | 5 | 4 | 4 | 3 |
| Example 58 | Product of Ex. 24 | 5 | 4 | 3 | 2 |
| Example 59 | Product of Ex. 25 | 5 | 5 | 4 | 2 |
| Example 60 | Product of Ex. 26 | 4 | 3 | 3 | 3 |
| Example 61 | Product of Ex. 27 | 5 | 5 | 5 | 3 |
| Example 62 | Product of Ex. 28 | 5 | 5 | 5 | 3 |
| Example 63 | Product of Ex. 29 | 4 | 4 | 3 | 3 |
| Example 64 | Product of Ex. 30 | 5 | 5 | 4 | 3 |
| Example 65 | Product of Ex. 31 | 5 | 5 | 5 | 3 |
| Example 66 | Product of Ex. 32 | 5 | 5 | 5 | 3 |
| Example 67 | Product of Ex. 33 | 5 | 5 | 5 | 4 |
| Example 68 | Product of Ex. 34 | 5 | 5 | 5 | 4 |

TABLE 8

| Slurry or powder composition | | Amount of precipitate After | | | Flavor |
|---|---|---|---|---|---|
| | | 3 day | 7 days | 14 days | |
| Comp. Ex. 25 | Product of Comp. Ex. 1 | 1 | 1 | 1 | 2 |
| Comp. Ex. 26 | Product of Comp. Ex. 2 | 1 | 1 | 1 | 2 |
| Comp. Ex. 27 | Product of Comp. Ex. 3 | 5 | 5 | 5 | 3 |
| Comp. Ex. 28 | Product of Comp. Ex. 4 | 5 | 5 | 5 | 3 |
| Comp. Ex. 29 | Product of Comp. Ex. 5 | 1 | 1 | 1 | 2 |
| Comp. Ex. 30 | Product of Comp. Ex. 6 | 2 | 1 | 1 | 2 |
| Comp. Ex. 31 | Product of Comp. Ex. 7 | 1 | 1 | 1 | 1 |
| Comp. Ex. 32 | Product of Comp. Ex. 8 | 1 | 1 | 1 | 2 |
| Comp. Ex. 33 | Product of Comp. Ex. 9 | 1 | 1 | 1 | 2 |
| Comp. Ex. 34 | Product of Comp. Ex. 10 | 2 | 1 | 1 | 2 |
| Comp. Ex. 35 | Product of Comp. Ex. 11 | 1 | 1 | 1 | 2 |
| Comp. Ex. 36 | Product of Comp. Ex. 12 | 1 | 1 | 1 | 2 |
| Comp. Ex. 37 | Product of Comp. Ex. 13 | 1 | 1 | 1 | 2 |
| Comp. Ex. 38 | Product of Comp. Ex. 14 | 1 | 1 | 1 | 2 |
| Comp. Ex. 39 | Product of Comp. Ex. 15 | 5 | 5 | 5 | 3 |
| Comp. Ex. 40 | Product of Comp. Ex. 16 | 5 | 5 | 5 | 3 |
| Comp. Ex. 41 | Product of Comp. Ex. 17 | 1 | 1 | 1 | 2 |
| Comp. Ex. 42 | Product of Comp. Ex. 18 | 2 | 1 | 1 | 2 |
| Comp. Ex. 43 | Product of Comp. Ex. 19 | 1 | 1 | 1 | 1 |
| Comp. Ex. 44 | Product of Comp. Ex. 20 | 1 | 1 | 1 | 2 |
| Comp. Ex. 45 | Product of Comp. Ex. 21 | 1 | 1 | 1 | 2 |
| Comp. Ex. 46 | Product of Comp. Ex. 22 | 2 | 1 | 1 | 2 |
| Comp. Ex. 47 | Product of Comp. Ex. 23 | 1 | 1 | 1 | 2 |
| Comp. Ex. 48 | Product of Comp. Ex. 24 | 1 | 1 | 1 | 2 |

EXAMPLE 69

The food additive slurry composition prepared by Example 2 which was weighed to be 30 g in terms of calcium, 2.5 Kg of a commercially available cow's milk, 120 g of butter, 1.45 kg of skimmed milk were added into 5 kg of water and homonized with stirring. After being sterilized and cooled by a normal method, 200 g of a starter preliminarily prepared were inculated into the mixture, and fermented at 38° for 5 hours. After agitation and homogenization, a drink type calcium-enriched yogurt was obtained.

The sensory test was conducted in the same manner as in Example 35. The results are shown in Table 9.

EXAMPLES 70 TO 74

Comparaive Examples 49 to 54

Mineral-enriched yogurts were obtained in the same manner as in Example 69, except that the food additive slurry compositions or the food additive powder compositions prepared by Examples 10, 16, 28, 30 and 34, Comparative Examples 1, 9, 10, 14, 15 and 23 were used and that each mineral concentration was adjusted to the same concentration as in Example 69. The inspection of the precipitate and the seosory test for flavor were performed in the same manner as in Example 35. The results are shown in Table 9.

TABLE 9

| Slurry or powder composition | | Amount of precipitate After | | | Flavor |
|---|---|---|---|---|---|
| | | 3 day | 7 days | 14 days | |
| Example 69 | Product of Ex. 2 | 4 | 3 | 2 | 3 |
| Example 70 | Product of Ex. 10 | 4 | 3 | 2 | 3 |
| Example 71 | Product of Ex. 16 | 5 | 5 | 5 | 4 |
| Example 72 | Product of Ex. 28 | 4 | 4 | 3 | 3 |
| Example 73 | Product of Ex. 30 | 4 | 3 | 2 | 3 |
| Example 74 | Product of Ex. 34 | 5 | 5 | 5 | 4 |
| Comp. Ex. 49 | Product of Comp. Ex. 1 | 2 | 1 | 1 | 2 |
| Comp. Ex. 50 | Product of Comp. Ex. 9 | 1 | 1 | 1 | 2 |
| Comp. Ex. 51 | Product of Comp. Ex. 10 | 1 | 1 | 1 | 2 |
| Comp. Ex. 52 | Product of Comp. Ex. 14 | 2 | 1 | 1 | 2 |
| Comp. Ex. 53 | Product of Comp. Ex. 15 | 4 | 3 | 2 | 3 |
| Comp. Ex. 54 | Product of Comp. Ex. 23 | 1 | 1 | 1 | 2 |

EXAMPLE 75

Using roasted and ground coffee beans, a coffee extract liquid was obtained. To 8 kg of this coffee extract liquid, 220 g of sugar, 2 kg of milk, and the food additive slurry composition prepared by Example 2 which was weighed to be 60 g in terms of calcium were mixed and stirred, and further water was added to make up the whole amount of 20 kg, which was further stirred. Adding sodium bicarbonate, the pH was adjusted to 6.7, and a blended solution was obtained by homogenizing. The blended solution was charged in cans, and sterilized by retort for 20 minutes at 123° C., and calcium-enriched canned coffee beverage was obtained.

The sensor test of the obtained conned coffee beverage was performed in the same manner as in Example 35. The results are shown in Table 10.

EXAMPLES 76 TO 80

Comparaive Examples 55 to 60

Mineral-enriched canned coffee beverages were obtained in the same manner as in Example 75, except that the food additive slurry compositions or the food additive powder compositions prepared by Examples 10, 16, 28, 30, 34, and Comparative Examples 1, 9, 10, 14, 15, 23 were used and that each mineral concentration was adjusted to the same concentration as in Example 75. The inspection of the precipitate and the seosory test for flavor were performed in the same manner as in Example 35. The results are shown in Table 10.

TABLE 10

| Slurry or powder composition | | Amount of precipitate After | | | |
|---|---|---|---|---|---|
| | | 30 day | 60 days | 90 days | Flavor |
| Example 75 | Product of Ex. 2 | 4 | 3 | 2 | 3 |
| Example 76 | Product of Ex. 10 | 4 | 3 | 2 | 3 |
| Example 77 | Product of Ex. 16 | 5 | 5 | 4 | 4 |
| Example 78 | Product of Ex. 28 | 4 | 4 | 3 | 3 |
| Example 79 | Product of Ex. 30 | 4 | 3 | 2 | 3 |
| Example 80 | Product of Ex. 34 | 5 | 5 | 4 | 4 |
| Comp. Ex. 55 | Product of Comp. Ex. 1 | 1 | 1 | 1 | 2 |
| Comp. Ex. 56 | Product of Comp. Ex. 9 | 1 | 1 | 1 | 2 |
| Comp. Ex. 57 | Product of Comp. Ex. 10 | 1 | 1 | 1 | 2 |
| Comp. Ex. 58 | Product of Comp. Ex. 14 | 1 | 1 | 1 | 2 |
| Comp. Ex. 59 | Product of Comp. Ex. 15 | 4 | 3 | 2 | 3 |
| Comp. Ex. 60 | Product of Comp. Ex. 23 | 1 | 1 | 1 | 2 |

As explained above, the food additive slurry or powder compositions are superior not only in re-dispersibility in liquid, dispersion stability in liquid for a long period of time and flavor, but are sufficiently low in slurry viscosity so that their handling is good. Moreover, food compositions prepared by the use of the food additive slurry or powder compositions are very excellent in dispersibility even without using a specific grinder and disperser and therefore are very advantageous economically.

What is claimed is:

1. A method for manufacturing a food additive slurry composition containing a polyvalent metal, a phosphoric acid ion, an organic acid having a carboxyl group, and an alkali metal, comprising the steps of:

preparing a precursor by mixing water, a polyvalent metal compound, and an organic acid having a carboxyl group, and adding to the precursor a phosphoric acid source and an alkali metal in at least one method selected from the group consisting of (a), (b), (c), (d), and (e) shown below:

(a) Addition of an alkali metal phosphate and/or an alkali metal of condensed phosphoric acid, (b) Simultaneous addition of an alkali metal phosphate and/or an alkali metal of condensed phosphoric acid, and an alkali metal salt, (c) Simultaneous addition of phosphoric acid and/or condensed phosphoric acid, and an alkali metal salt, (d) Addition of an alkali metal phosphate and/or an alkali metal of condensed phosphoric acid, and then addition of an alkali metal salt, and (e) Addition of phosphoric acid and/or condensed phosphoric acid, and then addition of an alkali metal salt to produce a food additive slurry.

2. The method for manufacturing a food additive slurry composition according to claim 1, wherein the method of addition of a phosphoric acid source and an alkali metal is either one method selected from (d) and (e).

3. The method for manufacturing a food additive slurry composition according to claim 1, wherein the molar ratio of the polyvalent metal compound, the organic acid having a carboxyl group, the phosphoric acid source, and the alkali metal is in a range of the polyvalent metal ion:the organic acid ion having a carboxyl group being 0.8:1 to 7:1, the organic acid ion having a carboxyl group:the phosphoric acid ion being 1:0.6 to 1:2.8, and the organic acid ion having a carboxyl group:the alkali metal ion being 1:1 to 1:8.

4. A method for manufacturing a food additive slurry composition, comprising the steps of:

containing 2 to 80 parts by weight of an emulsification stabilizer in 100 parts by weight of a solid content of a food additive slurry composition comprising a polyvalent metal, a phosphoric acid ion, an organic acid having a carboxyl group, and an alkali metal obtained by preparing a precursor by mixing water, a polyvalent metal compound, and an organic acid having a carboxyl group, and adding to the precursor a phosphoric acid source and an alkali metal in at least one method selected from the group consisting of (a), (b), (c), (d), and (e) shown below to produce a food additive slurry, and dispersing the obtained food additive slurry comprising grinding using a grinding machine and/or dispersing the food additive slurry using a dispersing machine:

(a) Addition of an alkali metal phosphate and/or an alkali metal of condensed phosphoric acid, (b) Simultaneous addition of an alkali metal phosphate and/or an alkali metal of condensed phosphoric acid, and an alkali metal salt, (c) Simultaneous addition of phosphoric acid and/or condensed phosphoric acid, and an alkali metal salt, (d) Addition of an alkali metal phosphate and/or an alkali metal of condensed phosphoric acid, and then addition of an alkali metal salt, and (e) Addition of phosphoric acid and/or condensed phosphoric acid, and then addition of an alkali metal salt.

5. The method for manufacturing a food additive slurry composition according to claim 4, wherein said grinding comprises wet grinding using a wet grinding machine, and said dispersing comprises ultrasonic dispersing using an ultrasonic dispersing machine, or emulsifying-dispersing using an emulsifying-dispersing machine.

6. A method for manufacturing a food additive powder composition comprising:

grinding and drying the food additive slurry composition obtained in the method according to any one of claims 1 to 5.

7. A food composition comprising:

the food additive slurry obtained in the method according to any one of claims 1 to 5.

* * * * *